United States Patent [19]

Leitman et al.

[11] 4,395,596
[45] Jul. 26, 1983

[54] MULTI-LINE CONTROLLER

[76] Inventors: Harold N. Leitman, 58 Talcot Rd., Portchester, N.Y. 10573; Walter J. Lange, 115 Columbia Ave., Jersey City, N.J. 07307

[21] Appl. No.: 313,541

[22] Filed: Nov. 2, 1981

[51] Int. Cl.³ .............................................. H04M 1/00
[52] U.S. Cl. ................................ 179/99 LC; 179/1 C
[58] Field of Search ............ 179/99 LC, 99 LS, 99 R, 179/1 SW, 1 C

[56] References Cited

U.S. PATENT DOCUMENTS 3,757,056  9/1973  Foulkes ............................. 179/99 R
4,351,987  9/1982  Feil ............................. 179/99 LC X Primary Examiner—Stafford D. Schreyer
Attorney, Agent, or Firm—Lieberman, Rudolph & Nowak

[57] ABSTRACT

A multi-line controller device which provides lamp control and ringing control for single line telephone accessory equipment when connected to a multi-line telephone system. Control is selectively provided for any incoming line of the multi-line system through a combination of a multi-position switch and an opto-coupler device.

3 Claims, 1 Drawing Figure

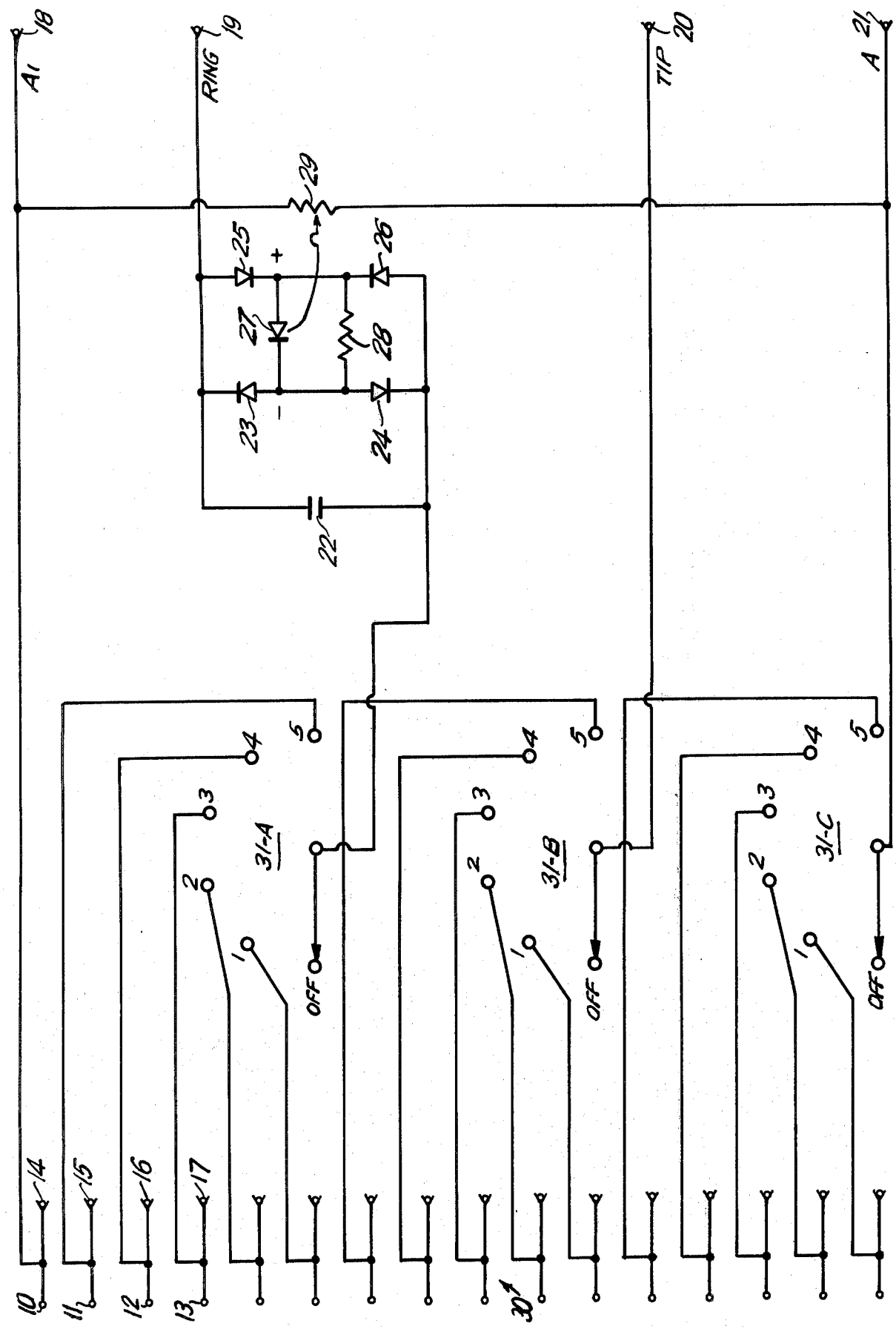

MULTI-LINE CONTROLLER

FIELD OF THE INVENTION

This invention relates to telephone accessory equipment and more particularly to a controller device which provides lamp and ringing control for single line telephone accessory equipment when used in a multi-line telephone environment.

BACKGROUND OF THE INVENTION

Telephone accessory devices such as automatic dialers, answering machines, cordless telephones, amplifiers for the audio impaired, etc. have recently become a rapidly growing segment of the consumer electronics market. Telephone answering machines have been in the vanguard of this expanding market and in fact, a telephone call today, made to the largest corporation or to a friend down the street, is likely to be answered by an intelligent machine which requests the caller to leave a message in anticipation of a return call at a later time.

The reasons for this rapid increase in a specialized segment of the consumer electronics market are two fold. First, recent decisions by the various federal agencies governing the telephone industry have removed many restrictions on the "terminal equipment" segment of the telephone industry and permitted any manufacturer to produce a product for connection to the telephone switched network. Second, the cost of electronic equipment has rapidly decreased in recent years, due to the shrinking cost of electronics components and large scale integration. Accordingly, large segments of the population can now readily afford the luxury of automatic dialers, cordless telephones and the joy of composing and broadcasting personalized messages via a telephone answering machine to all those who happen to telephone when the called party is not at home or otherwise indisposed.

Although telephone accessory devices are widely used a problem arises when such devices are used in a multi-line telephone environment and in particular when used with a key telephone system. With a key telephone system a plurality of incoming lines (typically 5) are terminated in a particular office or home and each user can select a particular line by simply pressing the appropriate button on the key telephone and lifting the receiver (going off hook). Going off hook with a key telephone lights a lamp on the telephone which indicates to all other users that a particular line is in use (lamp control) and also causes the telephone in use to stop ringing when an incoming call is received (ringing control). The telephone lines not in use of course ring normally in response to an incoming call. Lamp control and ringing control are provided by appropriate signals being returned to the telephone system to indicate that a particular line is in use. This ability is also known in the telephone industry as an A and A1 closure capability.

The problem with a telephone accessory device, such as an answering machine, is that the vast majority of telephone accessory devices (estimated at 95%) do not have the ability to provide an A and A1 closure signal to the telephone system. Therefore when such an accessory device is in use the appropriate lamp on the remaining telephones in the system does not light and the telephone in use will continue to ring although being in the "off-hook" condition. This of course may result in inadvertent eavesdropping, substantial annoyance to the key telephone user and possible malfunction of the telephone accessory equipment.

It is therefore an object of the instant invention to provide lamp and ringing control for a telephone accessory device when used in a multi-line telephone environment.

The various telephone operating companies are aware of this particular problem and have attempted to provide additional equipment to aid the user of a telephone accessory device. However the equipment typically provided by the telephone operating company is not only expensive and relatively complicated but it does not provide lamp and ringing control for use with a telephone accessory device.

It is therefore a further object of the instant invention to provide lamp and ringing control for any incoming line of a multi-line telephone system.

SUMMARY OF THE INVENTION

In accordance with the invention a multi-line controller selectively connects single line telephone accessory equipment to a particular incoming line of a multi-line telephone system.

It is a feature of the invention that A and A1 closure signals are provided to the multi-line telephone system when single line equipment is connected to any one of the plurality of incoming lines.

It is a further feature of the invention that providing A and A1 closure signals permits the single line equipment to achieve light and ringing control in any multi-line telephone system.

It is a still further feature of the invention that A and A1 closure is provided in part with a simple and inexpensive opto coupler device.

The foregoing and other objects and features of this invention will be more fully understood from the following description of an illustrative embodiment thereof taken in conjunction with the accompanying drawing.

BRIEF DESCRIPTION OF THE DRAWING

The FIGURE discloses, in schematic form, a circuit for providing A and A1 closure in accordance with the instant invention.

DETAILED DESCRIPTION

Referring now to the FIGURE the multi-line controller of the instant invention is designed to provide A and A1 closure for single line equipment when attached to any incoming line of a multi-line telephone system.

Shown to the left of the FIGURE is connector 30 which preferably consists of an Amphenol 50-pin connector designed to mate with a USOC RJ24X jack provided by the telephone operating company. The terminals to the left of connector 30, such as terminals 10–13 etc. mate with the incoming lines of the multi-line telephone system. The terminals to the right of connector 30, such as terminals 14–17 etc. mate with the registered multi-line equipment, such as a key telephone, on site in the user's premises.

Terminals 18–21, shown to the right of the FIGURE, connect with the registered single line equipment the user desires to connect to the multi-line telephone system. Terminals 19 and 20 are the Tip and Ring leads which provide a ringing and voice transmission path to the single line equipment. Terminals 18 and 21 are the A and A1 leads which provide A and A1 closure for the single line equipment as described below.

Switch 31 is a 6 position, 3 pole rotary switch used to choose one of the five incoming lines for connection to the single line equipment. The switch is divided into three sections A, B and C, has an OFF position which disconnects the single line equipment, and five additional positions for selecting a particular incoming line.

Assume now that the user desires to connect the single line equipment to the multi-line telephone system and moves switch 31 to position 1. This connects the Tip and Ring leads to the incoming lines as well as the A control lead. The A1 control lead is permanently attached to the incoming lines via terminal 10 as shown in the FIGURE.

When the single line equipment goes off hook loop current begins to flow through the Tip and Ring leads. Loop current is polarized by a diode bridge consisting of diodes 23-26 resulting in a d.c. forward bias being applied to Light Emitting Diode (LED) 27 with the polarity as shown in the FIGURE.

LED 27 and photo resistor 29 comprise an opto coupler such as the Vactec VTL5C9. When forward bias is applied to the LED it is turned ON applying light to the photo resister which causes a substantial decrease in resistance to approximately 150 ohms. The decrease in resistance permits current flow between the A and A1 leads through resister 29 which provides an A and A1 closure indication to the telephone system. When the single line equipment goes on hook, loop current ceases, the forward bias is removed from LED 27, and the resistance of photo-resistor 29 returns to its nominal high level of approximately 0.5 meg. ohms. It is of course understood that the circuit in the FIGURE will operate in the manner just described when connected to any one of the five incoming lines. Capacitor 22 provides an audio bypass for the diode bridge circuit and resister 28 is a shunt resister to prevent excessive current flow through diode 67. Although switch 31 is shown as a rotary switch it could also be a multi-position push button switch.

What has been described in a multi-line controller to provide A and A1 closure for single line equipment when connected to a multi-line telephone system. The instant invention allows a user to select any incoming line for A and A1 control and provides this feature in an inexpensive and novel circuit which is readily manufactured and used by an operator of single line equipment. Providing A and A1 closure allows the single line equipment to operate without a deterioration of functions and services, and in particular achieves light and ringing control for the single line equipment.

Although a specific embodiment of this invention has been shown and described, it will be understood that various modifications may be made without departing from the spirit of this invention.

We claim:

1. A multi-line controller for connecting single line telephone accessory equipment to a multi-line telephone system, comprising,
   means for selectively connecting said single line telephone accessory equipment to a particular incoming line of sid multi-line telephone system, and
   means operative when said single line telephone accessory equipment is connected to said particular line, and responsive to said single line equipment going off hook, for providing an A and A1 closure signal to the multi-line telephone system.

2. A multi-line controller in accordance with claim 1 wherein said selective connecting means includes a multi-position switch.

3. A multi-line controller in accordance with claim 1 wherein said providing means includes a diode bridge circuit connected in series with Tip and Ring leads extending to said single line accessory equipment, said diode bridge circuit providing a positive voltage potential when said single line equipment goes off hook, a light-emitting diode, to which said positive potential is applied, for providing a visible light source, a photo-resister, connected between A and A1 leads extending to said single line accesory equipment, said photo-resister decreasing in resistance in response to said visible light source to provide said A and A1 closure signal.

* * * * *